US009897091B2

(12) United States Patent
Hoshino et al.

(10) Patent No.: US 9,897,091 B2
(45) Date of Patent: Feb. 20, 2018

(54) MOTOR-DRIVEN TURBO COMPRESSOR

(71) Applicant: KABUSHIKI KAISHA TOYOTA JIDOSHOKKI, Kariya-shi, Aichi-ken (JP)

(72) Inventors: Nobuaki Hoshino, Kariya (JP); Toshiro Fujii, Kariya (JP); Ryo Umeyama, Kariya (JP); Satoru Egawa, Kariya (JP); Hironao Yokoi, Kariya (JP); Takahito Kunieda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 335 days.

(21) Appl. No.: 14/641,980

(22) Filed: Mar. 9, 2015

(65) Prior Publication Data

US 2015/0267707 A1  Sep. 24, 2015

(30) Foreign Application Priority Data

Mar. 19, 2014 (JP) .................................. 2014-056130
Feb. 27, 2015 (JP) .................................. 2015-038154

(51) Int. Cl.
*F04D 17/12* (2006.01)
*F04D 25/06* (2006.01)
(Continued)

(52) U.S. Cl.
CPC .......... *F04D 17/122* (2013.01); *F04D 25/06* (2013.01); *F04D 29/284* (2013.01); *F04D 29/4213* (2013.01); *F04D 29/5806* (2013.01); *H02K 7/14* (2013.01); *H02K 9/12* (2013.01)

(58) Field of Classification Search
CPC ...... F04D 17/12; F04D 17/122; F04D 17/125; F04D 25/06; F04D 25/0606;
(Continued)

(56) References Cited

U.S. PATENT DOCUMENTS

| 4,219,306 A | 8/1980 | Fujino et al. |
| 7,071,585 B2 * | 7/2006 | Lida .................. H02K 1/28 |
| | | 310/261.1 |

(Continued)

FOREIGN PATENT DOCUMENTS

| EP | 2258948 A2 | 12/2010 |
| EP | 2693138 A1 | 2/2014 |

(Continued)

OTHER PUBLICATIONS

Communication dated Aug. 12, 2015 from the European Patent Office in counterpart application No. 15158392.9.

*Primary Examiner* — Bryan Lettman
*Assistant Examiner* — Charles W Nichols
(74) *Attorney, Agent, or Firm* — Sughrue Mion, PLLC

(57) ABSTRACT

In a compressor of the present invention, an intermediate pressure port through which a first discharge chamber and a motor chamber communicate with each other is formed in a front housing. A refrigerant having an intermediate pressure is discharged to the first discharge chamber. Consequently, it is possible to guide the refrigerant having the intermediate pressure in the first discharge chamber to the motor chamber, and cool an electric motor, which generates heat during actuation, with the refrigerant having the intermediate pressure. In the compressor, a first impeller and a second impeller are disposed such that large diameter portions of the first impeller and the second impeller face each other. The second impeller is smaller in diameter than the first impeller.

2 Claims, 4 Drawing Sheets

(51) Int. Cl.
    *F04D 29/58*         (2006.01)
    *H02K 9/12*          (2006.01)
    *F04D 29/42*         (2006.01)
    *H02K 7/14*          (2006.01)
    *F04D 29/28*         (2006.01)

(58) Field of Classification Search
    CPC ............... F04D 29/284; F04D 29/4206; F04D 29/4213; F04D 29/285; F04D 29/286; F04D 29/403; F04D 29/441; F04D 29/5806; F04D 29/582; F04D 29/584; F04D 29/5846; F04D 29/5853; H02K 9/10; H02K 9/12
    USPC .................................... 417/199.1–199.3, 244
    See application file for complete search history.

(56) References Cited

U.S. PATENT DOCUMENTS

| | | | |
|---|---|---|---|
| 7,451,616 B2* | 11/2008 | Ro | F04D 29/05 62/505 |
| 8,061,151 B2* | 11/2011 | Telakowski | F04D 17/12 62/115 |
| 2007/0147985 A1* | 6/2007 | Takahashi | F04D 17/12 415/104 |

FOREIGN PATENT DOCUMENTS

| | | | |
|---|---|---|---|
| JP | 54-117916 A | 9/1979 |
| JP | 11-294879 A | 10/1999 |
| JP | 2001-234706 A | 8/2001 |
| JP | 2011-75254 A | 4/2011 |

* cited by examiner

MOTOR-DRIVEN TURBO COMPRESSOR

TECHNICAL FIELD

The present invention relates to a motor-driven turbo compressor.

BACKGROUND ART

Japanese Patent Application Laid-Open No. H11-294879 discloses a conventional motor-driven turbo compressor (hereinafter referred to as compressor). The compressor includes a housing, an electric motor, a rotating shaft, a first impeller, and a second impeller.

In the housing, a first impeller chamber, a second impeller chamber, and a motor chamber are formed. The first impeller chamber is located on one end side of the housing. The second impeller chamber is located on the other end side of the housing. The motor chamber is located between the first impeller chamber and the second impeller chamber. In the housing, a first suction port, a second suction port, a first discharge chamber, and a second discharge chamber are formed. The first suction port extends in the axial direction of the rotating shaft on one end side of the housing and communicates with the first impeller chamber. The second suction port extends in the axial direction of the rotating shaft on the other end side of the housing and communicates with the second impeller chamber. The first discharge chamber communicates with the first impeller chamber via a first diffuser. The second discharge chamber communicates with the second impeller chamber via a second diffuser.

Further, a first communication path and a second communication path are connected to the housing. The first communication path communicates with the first discharge chamber on one end side and communicates with the motor chamber on the other end side while extending to the outside of the housing. The second communication path communicates with the motor chamber on one end side and communicates with the second suction port on the other end side while extending to the outside of the housing.

The rotating shaft is rotatably supported by the housing and is capable rotating in the first impeller chamber and the second impeller chamber. The electric motor is accommodated in the motor chamber and drives to rotate the rotating shaft. The first impeller and the second impeller are arranged across the electric motor. Large diameter portions of the first and second impellers are faced to each other.

The first impeller is coupled to one end of the rotating shaft. The first impeller increases kinetic energy of a refrigerant in the first impeller chamber by rotating of the first impeller. Thereafter, the first impeller converts the kinetic energy of the refrigerant into pressure energy through the first diffuser, and compresses the refrigerant, and discharges the compressed refrigerant to the first discharge chamber. The second impeller is coupled to the other end of the rotating shaft. The second impeller increases kinetic energy of the refrigerant in the second impeller chamber by rotating of the second impeller. Thereafter, the second impeller converts the kinetic energy of the refrigerant into pressure energy through the second diffuser, and compresses the refrigerant, and discharges the compressed refrigerant to the second discharge chamber.

In the compressor, the refrigerant is sucked from the first suction port. The refrigerant is discharged to the first discharge chamber through the first impeller chamber and the first diffuser. Thereafter, the refrigerant is introduced into the motor chamber through the first communication path. The refrigerant is sucked from the motor chamber into the second suction port through the second communication path and discharged to the second discharge chamber through the second impeller chamber and the second diffuser. In this way, the refrigerant is compressed in two stages.

In this case, since the large diameter portion of the first impeller is located on the motor chamber side, a first thrust force for urging the rotating shaft to be drawn into the first impeller chamber is generated. Since the large diameter portion of the second impeller is also located on the motor chamber side, a second thrust force for urging the rotating shaft to be drawn into the second impeller chamber is generated. That is, the first thrust force and the second thrust force can offset each other. Here, it is also possible to set a difference between the outer diameter of the first impeller and the outer diameter of the second impeller to reduce a resultant force of the first and second thrust forces as much as possible. In this case, since a thrust bearing can be reduced in size, it is possible to realize a reduction in manufacturing costs and a reduction in the size of the compressor.

Further, in the compressor, since the refrigerant discharged to the first discharge chamber is introduced into the motor chamber by the first communication path, it is possible to cool the electric motor. Therefore, it is possible to attain improvement of durability of the electric motor.

However, in the compressor, the first discharge chamber and the motor chamber communicate with each other through the first communication path extending to the outside of the housing. The motor chamber and the second suction port communicate with each other through the second communication path extending to the outside of the housing. Therefore, the first and second communication paths project from the outer circumferential surface of the housing. A reduction in the size of the body diameter of the compressor is spoiled.

Further, in the compressor, the first impeller chamber, the first diffuser, and the first discharge chamber are formed on one end side of the housing. The second impeller chamber, the second diffuser, and the second discharge chamber are formed on the other end side of the housing. Therefore, both of the first communication path and the second communication path are inevitably long in the axial direction. Therefore, in the compressor, an increase in the axial length also occurs. Channel resistance of the refrigerant is large. There is also concern about a power loss.

The present invention has been devised in view of the circumstances in the past and it is a problem to be solved by the invention to provide a motor-driven turbo compressor in which a power loss hardly occurs while a reduction in manufacturing costs, a reduction in size, and improvement of durability are surely realized.

SUMMARY OF THE INVENTION

A motor-driven turbo compressor of the present invention comprises:

a housing in which an impeller chamber and a motor chamber are formed;

an electric motor accommodated in the motor chamber;

a rotating shaft provided in the housing and driven to rotate by the electric motor;

a first impeller and a second impeller accommodated in the impeller chamber and provided on the rotating shaft such that large diameter portions of the first impeller and the second impeller face each other;

a first suction port formed in the housing and configured to suck a refrigerant into the impeller chamber;

a first discharge chamber formed in the housing and into which the refrigerant supplied to the first impeller via the first suction port and compressed by rotation of the first impeller is discharged;

an intermediate pressure port formed in the housing and through which the first discharge chamber communicates with the motor chamber;

a second suction port formed in the housing and communicating with the motor chamber; and a second discharge chamber formed in the housing and into which the refrigerant supplied to the second impeller via the second suction port and compressed by rotation of the second impeller is discharged. The first impeller, the second impeller, and the electric motor are arranged in the axial direction of the rotating shaft in this order. The first impeller and the second impeller are smaller in diameter than the inner diameter of the motor chamber. The second impeller is smaller in diameter than the first impeller. The first discharge chamber is located in the outer side of the first impeller with respect to the radial direction of the rotating shaft. The second discharge chamber is located in the outer side of the second impeller with respect to the radial direction of the rotating shaft. The intermediate pressure port is located in the outer side of the second discharge chamber with respect to the radial direction of the rotating shaft.

Other aspects and advantages of the present invention will be apparent from the embodiments disclosed in the following description and the attached drawings, the illustrations exemplified in the drawings, and the concept of the invention disclosed in the entire description and drawings.

DETAILED DESCRIPTION OF EXEMPLARY EMBODIMENTS

An embodiment embodying the present invention is explained below with reference to the drawings. A compressor in the embodiment is a motor-driven turbo compressor for a vehicle. The compressor is mounted on a vehicle and configures a refrigeration circuit of an air conditioner for a vehicle.

Figure 1:
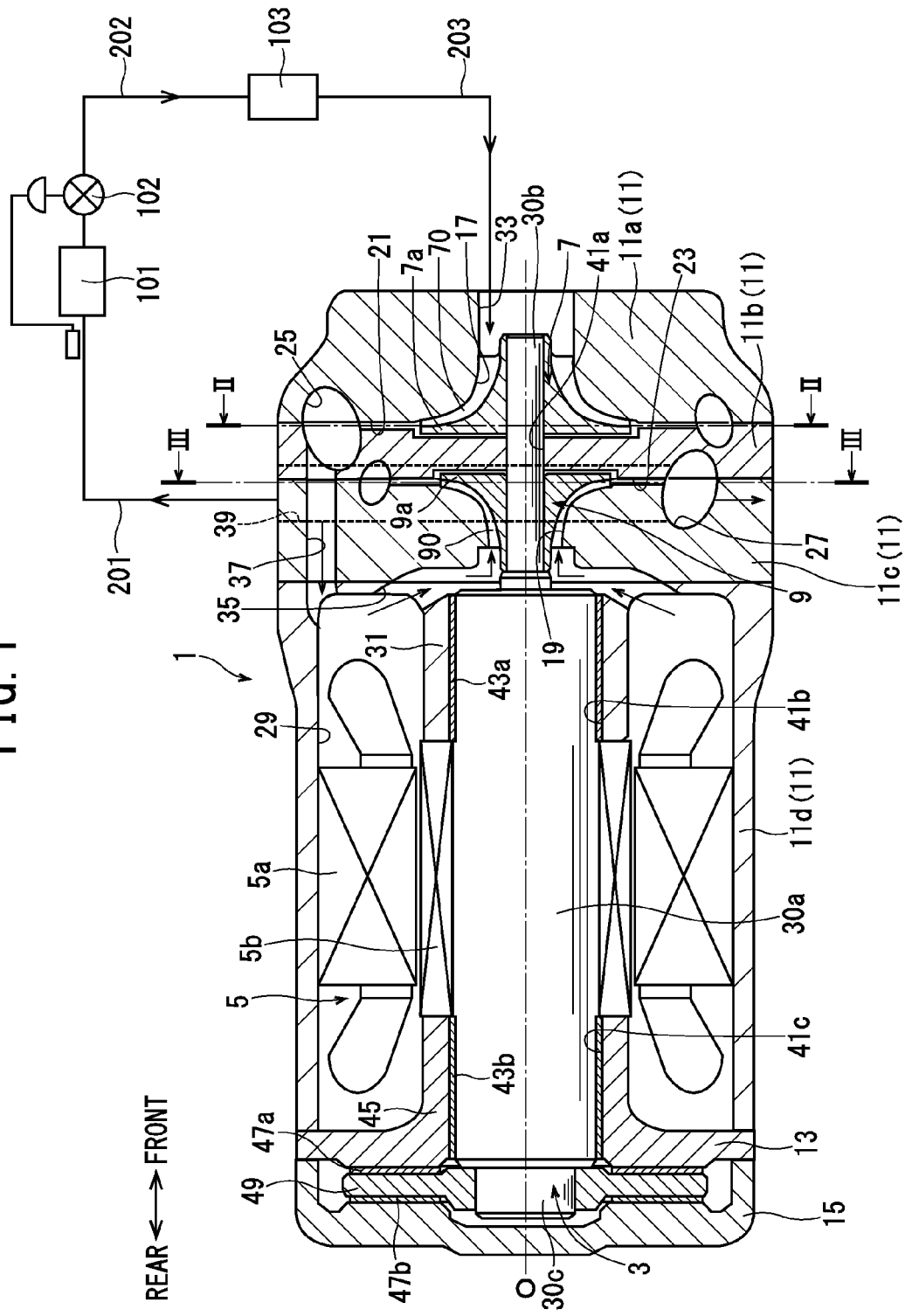
FIG. 1 is a sectional view showing a compressor in an embodiment.

As shown in FIG. 1, the compressor in the embodiment includes a housing 1, a rotating shaft 3, an electric motor 5, a first impeller 7, and a second impeller 9.

The housing 1 includes a front housing 11, an end plate 13, and a rear housing 15.

The front housing 11 consists of a first front housing 11a, a second front housing 11b, a third front housing 11c, and a fourth front housing 11d. In the front housing 11, the first front housing 11a, the second front housing 11b, the third front housing 11c, and the fourth front housing 11d are joined in this order from the front end side toward the rear end side. The front housing 11 is formed into a substantially cylindrical shape as a whole. In the front housing 11, first and second impeller chambers 17 and 19, first and second diffusers 21 and 23, first and second discharge chambers 25 and 27, a motor chamber 29, a first boss 31, first and second suction ports 33 and 35, an intermediate pressure port 37, and a discharge port 39 are formed. The first and second impeller chambers 17 and 19 constitute the impeller chamber.

The first impeller chamber 17 is formed on the front end side of the front housing 11. More specifically, the front end side of the first impeller chamber 17 is formed in the first front housing 11a. The rear end side of the first impeller chamber 17 is formed in the second front housing 11b. The first impeller chamber 17 is formed in a shape gradually expanding in diameter from the front end side toward the rear end side.

The second impeller chamber 19 is formed on the rear side of the first impeller chamber 17 in the front housing 11. More specifically, the front end side of the second impeller chamber 17 is formed in the second front housing 11b. The rear end side of the second impeller chamber 17 is formed in the third front housing 11c. The second impeller chamber 19 is smaller in diameter than the first impeller chamber 17. The second impeller chamber 19 is formed in a shape gradually contracting in diameter from the front end side toward the rear end side. In the second front housing 11b, a first shaft hole 41a extending in the housing 1 in the axial direction of the rotating shaft 3 is formed.

The first diffuser 21 is formed on the front end side of the second front housing 11b and located in the outer side of the first impeller chamber 17 with respect to the radial direction of the rotating shaft 3. The first diffuser 21 communicates with the first impeller chamber 17 in a largest diameter part of the first impeller chamber 17. The second diffuser 23 is formed on the front end side of the third front housing 11c and located in the outer side of the second impeller chamber 19 with respect to the radial direction of the rotating shaft 3. The second diffuser 23 communicates with the second impeller chamber 19 in a largest diameter part of the second impeller chamber 19. The second diffuser 23 is formed smaller in diameter than the first diffuser 21.

Figure 2:
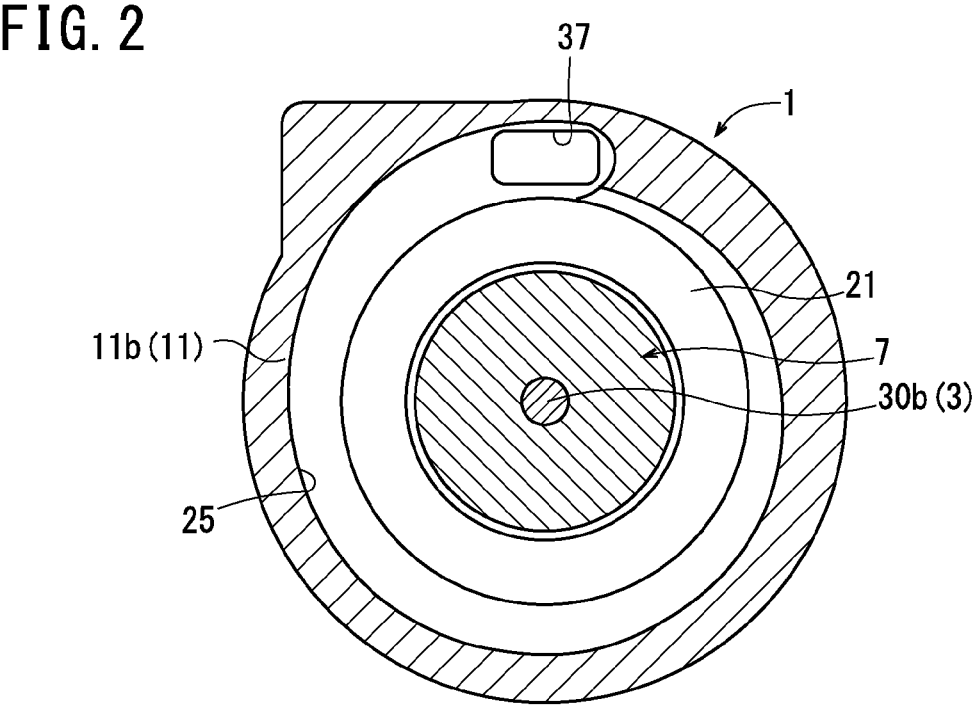
FIG. 2 is an arrow sectional view from a II-II direction in FIG. 1 according to the compressor of embodiment.

The front end side of the first discharge chamber 25 is formed in the first front housing 11a. The rear end side of the first discharge chamber 25 is formed in the second front housing 11b. As shown in FIG. 2, the first discharge chamber 25 is located in the outer side of the first diffuser 21 with respect to the radial direction of the rotating shaft 3 and communicates with the first diffuser 21. Consequently, the first impeller chamber 17 and the first discharge chamber 25 communicate with each other through the first diffuser 21. The first discharge chamber 25 is formed into a spiral shape. The first discharge chamber 25 is formed such that a passage sectional area gradually increases.

Figure 3:
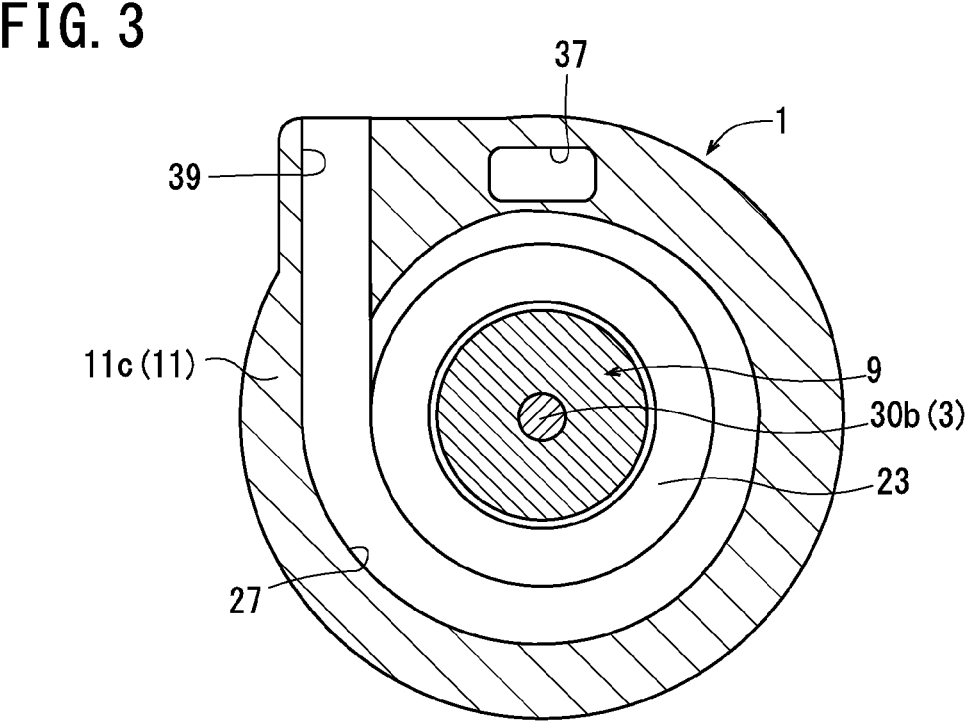
FIG. 3 is an arrow sectional view from a III-III direction in FIG. 1 according to the compressor of embodiment.

As shown in FIG. 1, the front side of the second discharge chamber 27 is formed in the second front housing 11b. The rear end side of the second discharge chamber 27 is formed in the third front housing 11c. As shown in FIG. 3, the second discharge chamber 27 is located in the outer side of the second diffuser 23 with respect to the radial direction of the rotating shaft 3 and communicates with the second diffuser 23. Consequently, the second impeller chamber 19 and the second discharge chamber 27 communicate with each other through the second diffuser 23. Like the first discharge chamber 25, the second discharge chamber 27 is formed into a spiral shape. The second discharge chamber 27 is formed such that a passage sectional area gradually increases.

Figure 4:
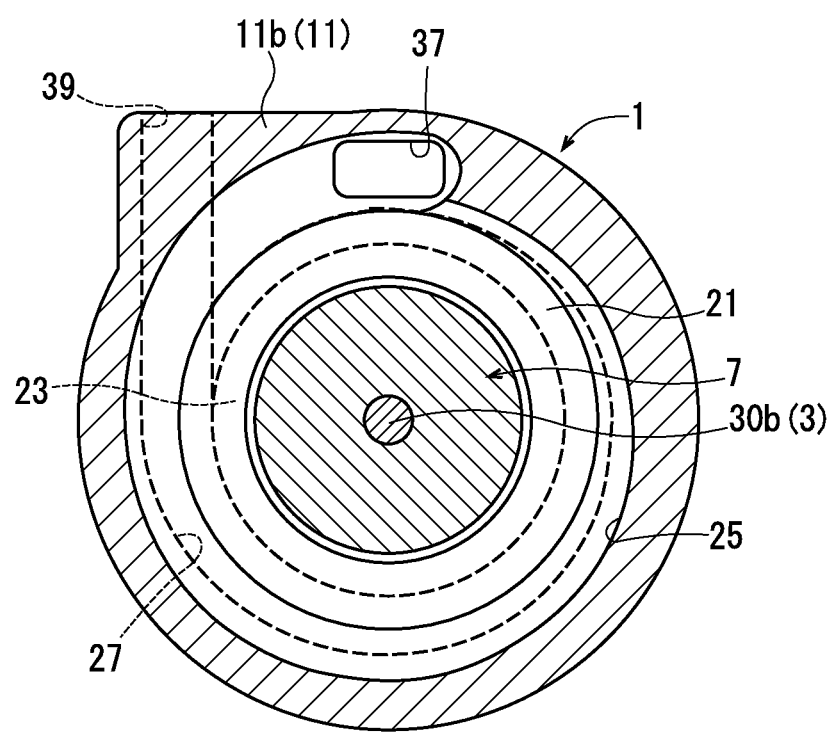
FIG. 4 is a sectional view from the direction same as the direction in FIG. 2 according to the compressor of embodiment.

Here, as explained above, the second impeller chamber 19 and the second diffuser 23 are respectively smaller in diameter than the first impeller chamber 19 and the first diffuser 21. Therefore, as shown in FIG. 4, the first discharge chamber 25 is located in the outer side of the second discharge chamber 27 with respect to the radial direction of the rotation shaft 3. Further, as shown in FIG. 3, the outer circumference side of the second discharge chamber 27 communicates with the discharge port 39. The discharge port 39 extends in the radial direction of the housing 1.

As shown in FIG. 1, the motor chamber 29 is formed in the fourth front housing 11d. Consequently, in the front housing 11, the first impeller chamber 17, the second impeller chamber 19, and the motor chamber 29 are formed in this order from the front end side toward the rear end side. The motor chamber 29 extends in the axial direction of the housing 1 and defined by the fourth front housing 11d and the end plate 13.

The first boss 31 is formed on the front end side of the motor chamber 29 in the fourth front housing 11d and extends toward the rear end side of the motor chamber 29 in the axial direction of the housing 1. In the first boss 31, a second shaft hole 41b extending in the axial direction of the housing 1 is formed. In the second shaft hole 41b, a first radial foil bearing 43a is provided.

The first suction port 33 is formed on the front end side of the first front housing 11a. That is, the first suction port 33 is located on the front end side of the housing 1. The first suction port 33 extends in the axial direction of the housing 1. The front end side of the first suction port 33 opens on the front end face of the first front housing 11a. The rear end side of the first suction port 33 communicates with the first impeller chamber 17.

The second suction port 35 is formed to extend across the rear end side of the third front housing 11c and the front end side of the fourth front housing 11d. The rear end side of the second suction port 35 communicates with the motor chamber 29 on the front end side of the first boss 31. On the other hand, the front end side of the second suction port 35 communicates with the second impeller chamber 19. Further, the second suction port 35 communicates with the second shaft hole 41b. The motor chamber 29, the second shaft hole 41b, and the second impeller chamber 19 communicate with one another through the second suction port 35.

As shown in FIG. 1, the intermediate pressure port 37 is located on the outer side of the second discharge chamber 27 with respect to the radial direction of the rotating shaft 3. The intermediate pressure port 37 is formed to extend across the second to fourth front housings 11b to 11d in the axial direction of the housing 1. As shown in FIG. 2, in the second front housing 11b, the front end side of the intermediate pressure port 37 communicates with the outer circumference side of the first discharge chamber 25. On the other hand, as shown in FIG. 1, in the fourth front housing 11d, the rear end side of the intermediate pressure port 37 communicates with the motor chamber 29. Consequently, the first discharge chamber 25 and the motor chamber 29 communicate with each other in the axial direction through the intermediate pressure port 37. Further, as shown in FIG. 4, in the front housing 11, the intermediate pressure port 37 and the discharge port 39 are formed in positions shifted in the radial direction.

The endplate 13 is joined to the rear end of the fourth front housing 11d, that is, the rear end of the front housing 11. The rear end of the motor chamber 29 is defined by the end plate 13. In the end plate 13, a second boss 45 extending toward the motor chamber 29 side in the axial direction of the housing 1 is formed. In the second boss 45, a third shaft hole 41c extending in the axial direction of the housing 1 is formed. In the third shaft hole 41c, a second radial foil bearing 43b is provided.

The rear housing 15 is located behind the housing 1 and joined to the end plate 13. That is, the rear housing 15 sandwiches the endplate 13 in conjunction with the front housing 11. In the rear housing 15, first and second thrust foil bearings 47a and 47b and a support plate 49 are provided. The first thrust foil bearing 47a is located on the front end side of the support plate 49 and sandwiched by the endplate 13 and the support plate 49. The second thrust foil bearing 47b is located on the rear end side of the support plate 49 and sandwiched by the support plate 49 and the rear housing 15.

The rotating shaft 3 includes a rotating shaft main body 30a, a first small diameter portion 30b located on the front end side of the rotating shaft main body 30a, and a second small diameter portion 30c located on the rear end side of the rotating shaft main body 30. The rotating shaft main body 30a is formed in a largest diameter in the rotating shaft 3. On the other hand, both of the first and second small diameter portions 30b and 30c are formed smaller in diameter than the rotating shaft main body 30a. The first small diameter portion 30b is formed in diameter smaller than the second small diameter portion 30c.

The rotating shaft 3 is inserted through the housing 1 and is capable of rotating in the housing 1. Specifically, the front end side of the rotating shaft main body 30a is inserted through the second shaft hole 41b and rotatably supported by the first radial foil bearing 43a. On the other hand, the rear end side of the rotating shaft main body 30a is inserted through the third shaft hole 41c and rotatably supported by the second radial foil bearing 43b. Further, the first small diameter portion 30b is inserted through the first shaft hole 41a. The rear end side of the first small diameter portion 30b is located in the second suction port 35. That is, apart of the rotating shaft 3 is exposed in the second suction port 35. The second small diameter portion 30c is inserted through the support plate 49 in the rear housing 15. Consequently, the second small diameter portion 30c and by extension, the rotating shaft 3 are supported by the first and second thrust foil bearings 47a and 47b via the support plate 49.

The electric motor 5 is provided in the motor chamber 29. The electric motor 5 consists of a stator 5a and a rotor 5b. The stator 5a is fixed to the inner wall of the motor chamber 29. The stator 5a is electrically connected to a not-shown battery. The rotor 5b is located on the inner side of the stator 5a with respect to the radial direction of the rotating shaft 3. In the motor chamber 29, the rotor 5b is arranged between the first boss 31 and the second boss 45. The rotor 5b is fixed to the rotating shaft main body 30a. Consequently, the rotor 5b is capable of rotating integrally with the rotating shaft 3 in the stator 5a.

The first impeller 7 is press-fitted into the front end side of the first small diameter portion 30b and provided in the first impeller chamber 17. Consequently, the first impeller 7 is capable of rotating in the first impeller chamber 17 according to the rotation of the rotating shaft 3. The first impeller 7 is formed in diameter smaller than the inner diameter of the motor chamber 29. The first impeller 7 is formed in a shape gradually expanding in diameter from the front end side toward the rear end side. The rear end side of the first impeller 7 is formed as a large diameter portion 7a. Further, a plurality of blades 70 are provided at a predetermined interval on the surface of the first impeller 7.

The second impeller 9 is press-fitted into the rear end side of the first small diameter portion 30b and provided in the second impeller chamber 19. Consequently, the second impeller 9 is capable of rotating in the second impeller chamber 19 according to the rotation of the rotating shaft 3. The second impeller 9 is also formed in diameter smaller than the inner diameter of the motor chamber 29. Further, the second impeller 9 is formed similar to the first impeller 7 and is formed to have size of about 70% to 90% of the size of the first impeller 7. The second impeller 9 is formed in a shape gradually contracting in diameter from the front end side toward the rear end side. The second impeller 9 is provided on the first small diameter portion 30b such that a large diameter portion 9a on the front end side is located on the front end side of the front housing 11. Consequently, in the compressor, in the front housing 11, the first impeller 7 and the second impeller 9 are disposed in a direction in which the rear sides of the first impeller 7 and the second impeller 9 face each other. Further, a plurality of blades 90 are provided at a predetermined interval on the surface of the second impeller 9.

In the compressor, a pipe 201 linked to a condenser 101 is connected to the discharge port 39. The condenser 101 is connected to an evaporator 103 via a pipe 202 and an expansion valve 102. The evaporator 103 is connected to the first suction port 33 through a pipe 203. A refrigeration circuit of an air-conditioning apparatus for a vehicle is configured by the compressor, the condenser 101, the expansion valve 102, the evaporator 103, and the like.

In the compressor configured as explained above, the stator 5a rotate the rotor 5b by electricity the electric motor 5. Consequently, the rotating shaft 3 is driven to rotate around a rotational axis O in the housing 1. Therefore, the first impeller 7 rotates in the first impeller chamber 17. The second impeller 9 rotates in the second impeller chamber 19.

Further, a low-pressure refrigerant that passes through the evaporator 103 is sucked into the first suction port 33 through the pipe 203 and reaches the inside of the first impeller chamber 17. The first impeller 7 rotating in the first impeller chamber 17 increases kinetic energy of the refrigerant in the first impeller chamber 17. Thereafter, the first impeller 7 converts the kinetic energy of the refrigerant into pressure energy through the first diffuser 21, and compresses the refrigerant, and discharges the compressed refrigerant to the first discharge chamber 25. Consequently, the pressure of the refrigerant in the first discharge chamber 25 changes to an intermediate pressure. The refrigerant having the intermediate pressure circulates from the first discharge chamber 25 to the intermediate pressure port 37 and flows into the motor chamber 29 as indicated by a solid line arrow in the FIG. 1.

The refrigerant flown into the motor chamber 29 is sucked from the second suction port 35 into the second impeller chamber 19 as indicated by a solid line arrow in the FIG. 1. In this case, the refrigerant circulating through the second suction port 35 is sucked into the second impeller chamber 19 while coming into contact with the first small diameter portion 30b of the rotating shaft 3. The second impeller 9 rotating in the second impeller chamber 19 increases kinetic energy of the refrigerant in the second impeller chamber 19. Thereafter, the second impeller 9 converts the kinetic energy of the refrigerant into pressure energy through the second diffuser 23, and compresses the refrigerant, and discharges the compressed refrigerant to the second discharge chamber 27. In this way, in the compressor, the refrigerant sucked from the first suction port 33 is compressed in two stages.

In the compressor, the first impeller 7, the second impeller 9, and the electric motor 5 are arranged in this order in the axial direction of the rotating shaft 3. Consequently, in the compressor, the first impeller chamber 17, the second impeller chamber 19, and the motor chamber 29 are formed in this order in the axial direction from the front end side toward the rear end side with respect to the front housing 11. In the compressor, the intermediate pressure port 37 is formed in the front housing 11 and located on the outer side of the second discharge chamber 27 with respect to the radial direction of the rotating shaft 3. The first discharge chamber 25 and the motor chamber 29 communicate with each other in the axial direction of the front housing 11 through the intermediate pressure port 37. Consequently, in the compressor, in the front housing 11, it is possible to guide the refrigerant having the intermediate pressure in the first discharge chamber 25 to the motor chamber 29 through the intermediate pressure port 37. Therefore, in the compressor, it is possible to cool the electric motor 5 that generates heat during actuation by the refrigerant having the intermediate pressure.

In the compressor, the intermediate pressure port 37 is formed in the axial direction of the front housing 11. Therefore, it is possible to suppress an increase in the body diameter of the compressor. Further, since both of the first and second impellers 7 and 9 are smaller in diameter than the inner diameter of the motor chamber 29, it is possible to suppress an increase in the body diameter of the compressor. Here, in the compressor, the second impeller 9 is smaller in diameter than the first impeller 7. The second impeller chamber 19 is smaller in size than the first impeller chamber 17. Therefore, in the compressor, it is possible to easily cause the first discharge chamber 25 and the motor chamber 29 to communicate with each other in the axial direction through the intermediate pressure port 37.

Further, in the compressor, the second suction port 35 is formed in the front housing 11. The first discharge chamber 25 and the second suction port 35 communicate with each other via the intermediate pressure port 37 and the motor chamber 29. In the compressor, the first impeller chamber 17, the second impeller chamber 19, and the motor chamber 29 are formed in this order in the axial direction with respect to the front housing 11. Therefore, in the compressor, in the front housing 11, the second suction port 35 and the motor chamber 29 are arranged close to each other. The rear end side of the second suction port 35 opens in the motor chamber 29. Therefore, in the compressor, the refrigerant in the motor chamber 29 is suitably sucked into the second suction port 35. Consequently, in the compressor, it is possible to reduce a power loss of the refrigerant circulating from the motor chamber 29 to the second impeller chamber 19.

In the compressor, the refrigerant circulating through the second suction port 35 is sucked into the second impeller chamber 19 while coming into contact with the first small diameter portion 30b. Therefore, in the compressor, it is possible to cool the rotating shaft 3 by the refrigerant circulating through the second suction port 35.

Further, in the compressor, the first impeller 7 and the second impeller 9 are disposed in the direction in which the rear sides of the first impeller 7 and the second impeller 9 face each other. That is, in the compressor, the first impeller 7 and the second impeller 9 are arranged with the large diameter portions 7a and 9a faced to each other. In the compressor, the second impeller 9 is formed smaller in diameter than the first impeller 7. Therefore, in the compressor, the first thrust force and the second thrust force act to offset each other. The resultant force of the first and second thrust forces decreases. Therefore, in the compressor, it is possible to adopt the first and second thrust foil bearings 47a and 47b that are small in size.

Therefore, with the compressor in the embodiment, a power loss hardly occurs while a reduction in manufacturing costs, a reduction in size, and improvement of durability are surely realized.

The present invention is explained above according to the embodiment. However, the present invention is not limited to the embodiment. It goes without saying that the present invention can be changed and applied as appropriate without departing from the gist of the present invention.

Figure 5:
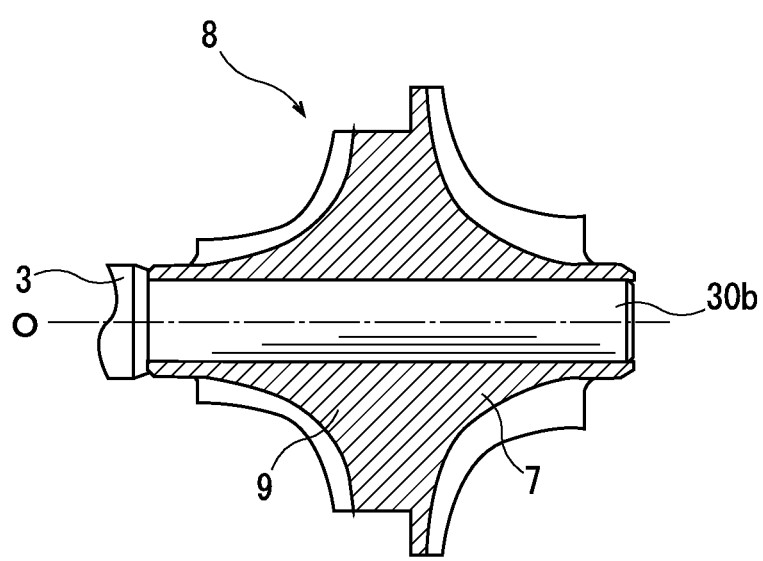
FIG. 5 is a sectional view of the first impeller and the second impeller according to the compressor of Variation 1.
Figure 6:
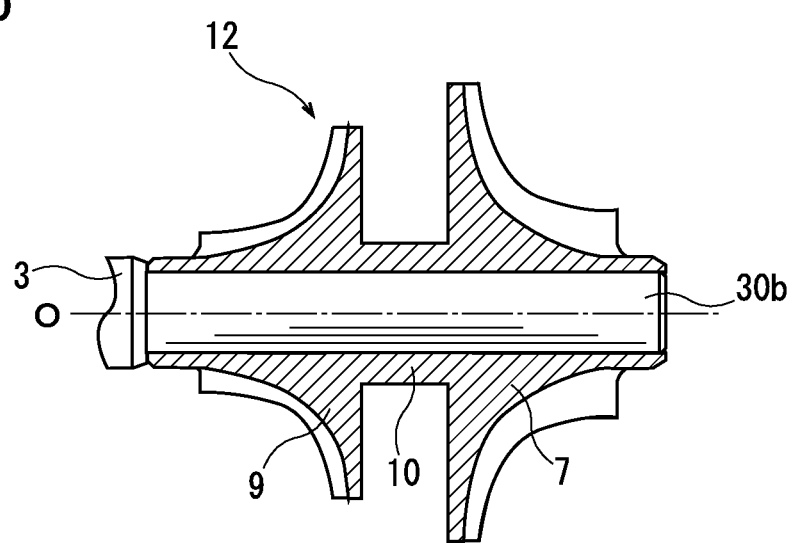
FIG. 6 is a sectional view of the first impeller and the second impeller according to the compressor of Variation 2.

For example, although the first impeller 7 and the second impeller 9 in the embodiment are separate members respectively press-fitted into the front end side and the rear end side of the first small diameter portion 30b of the rotation shaft 3, the first impeller 7 and the second impeller 9 may be integrated as an impeller 8 (Variation 1) as shown in FIG. 5. Further, the first impeller 7 and the second impeller 9 may be integrated as an impeller 12 using a connector 10 (Variation 2) as shown in FIG. 6.

The invention claimed is:

1. A motor-driven turbo compressor comprising:
    a housing in which an impeller chamber and a motor chamber are formed;
    an electric motor accommodated in the motor chamber;
    a rotating shaft provided in the housing and driven to rotate by the electric motor;
    a first impeller and a second impeller accommodated in the impeller chamber and provided on the rotating shaft such that large diameter portions of the first impeller and the second impeller face each other;
    a first suction port formed in the housing and configured to suck a refrigerant into the impeller chamber;
    a first discharge chamber formed in a spiral shape in the housing and into which the refrigerant supplied to the first impeller via the first suction port and compressed by rotation of the first impeller is discharged, wherein a passage sectional area of the first discharge chamber gradually increases toward an outer circumferential side;
    an intermediate pressure port formed in the housing and through which the first discharge chamber communicates with the motor chamber;
    a second suction port formed in the housing and communicating with the motor chamber; and
    a second discharge chamber formed in a spiral shape in the housing and into which the refrigerant supplied to the second impeller via the second suction port and compressed by rotation of the second impeller is discharged, wherein a passage sectional area of the second discharge chamber gradually increases toward an outer circumferential side, wherein
    the first impeller, the second impeller, and the electric motor are arranged in the axial direction of the rotating shaft in this order,
    the first impeller and the second impeller are smaller in diameter than the inner diameter of the motor chamber,
    the second impeller is smaller in diameter than the first impeller,
    the first discharge chamber is located in the outer side of the first impeller with respect to the radial direction of the rotating shaft,
    the second discharge chamber is located in the outer side of the second impeller with respect to the radial direction of the rotating shaft, and
    the intermediate pressure port is located in the outer side of the second discharge chamber with respect to the radial direction of the rotating shaft so as to be located at a side of the second discharge chamber that has a smaller cross sectional area than the remaining portions of the second discharge chamber.

2. The motor-driven turbo compressor according to claim 1, wherein
    the impeller chamber includes a second impeller chamber that accommodates the second impeller,
    the motor chamber communicates with the second impeller chamber through the second suction port, and
    a part of the rotating shaft is exposed in the second suction port.

* * * * *